(12) United States Patent
Fleischhacker

(10) Patent No.: US 10,874,234 B2
(45) Date of Patent: Dec. 29, 2020

(54) BEVERAGE CONTAINER

(71) Applicant: Plastipak Packaging, Inc., Plymouth, MI (US)

(72) Inventor: Kyle Fleischhacker, Dearborn, MI (US)

(73) Assignee: Plastipak Packaging, Inc., Plymouth, MI (US)

(*) Notice: Subject to any disclaimer, the term of this patent is extended or adjusted under 35 U.S.C. 154(b) by 421 days.

(21) Appl. No.: 15/371,789

(22) Filed: Dec. 7, 2016

(65) Prior Publication Data

US 2017/0156524 A1 Jun. 8, 2017

Related U.S. Application Data

(60) Provisional application No. 62/264,646, filed on Dec. 8, 2015.

(51) Int. Cl.
| | |
|---|---|
| *A47G 19/22* | (2006.01) |
| *A47G 23/02* | (2006.01) |
| *B65D 23/00* | (2006.01) |
| *A45F 3/16* | (2006.01) |
| *B65B 3/04* | (2006.01) |
| *B65D 41/04* | (2006.01) |
| *B29L 31/00* | (2006.01) |
| *B29C 49/10* | (2006.01) |
| *B29K 67/00* | (2006.01) |

(Continued)

(52) U.S. Cl.
CPC ............ *A47G 19/2255* (2013.01); *A45F 3/16* (2013.01); *A47G 19/2272* (2013.01); *A47G 23/0225* (2013.01); *B65B 3/04* (2013.01); *B65D 23/001* (2013.01); *B65D 41/04* (2013.01); *B29C 49/10* (2013.01); *B29K 2067/003* (2013.01); *B29L 2031/712* (2013.01); *B29L 2031/7132* (2013.01); *B65B 3/022* (2013.01); *B65B 7/28* (2013.01)

(58) Field of Classification Search
CPC .......... A47G 19/00–2255; A47G 23/00–0225; A47G 19/2272; B65D 23/00–001; B65D 41/00–04; B65B 3/04; B65B 3/022; B65B 7/28; B29L 2031/7132; B29L 2031/712; B29K 2067/003; B29C 49/10
USPC .... 220/630, 703, 705, 710.5, 711, 713, 717; 215/377, 378, 387; 53/452
See application file for complete search history.

(56) References Cited

U.S. PATENT DOCUMENTS

| | | | | |
|---|---|---|---|---|
| 640,860 A | * | 1/1900 | Baum | ...................... B65D 1/06 |
| | | | | 215/377 |
| 8,875,922 B2 | * | 11/2014 | Bernstein | ........... A47G 19/2205 |
| | | | | 215/200 |

(Continued)

FOREIGN PATENT DOCUMENTS

| | | |
|---|---|---|
| WO | 96005123 A1 | 2/1996 |
| WO | 0130685 A1 | 5/2001 |

*Primary Examiner* — Kareen K Thomas
(74) *Attorney, Agent, or Firm* — Vivacqua Crane, PLLC

(57) ABSTRACT

A beverage container assembly includes a base, a beverage container, and a sealable cap. The beverage container includes an open end and a closed end opposite the open end. The open end of the beverage container includes an external thread. The sealable cap includes an internal thread and is disposed on the open end of the beverage container creating a sealed opening. The base is disposed on the closed end of the beverage container and the cap seals the open end of the beverage container.

6 Claims, 3 Drawing Sheets

(51) Int. Cl.
*B65B 3/02* (2006.01)
*B65B 7/28* (2006.01)

(56) References Cited

U.S. PATENT DOCUMENTS

| | | | |
|---|---|---|---|
| 9,051,082 B1* | 6/2015 | Klinge | B65D 23/001 |
| 10,390,640 B2* | 8/2019 | Turner | B65D 85/72 |
| 2005/0139570 A1* | 6/2005 | Lambert | A47G 19/2205 |
| | | | 215/223 |
| 2008/0264958 A1* | 10/2008 | Blake | B65D 41/3447 |
| | | | 220/703 |
| 2009/0321458 A1 | 12/2009 | Blair et al. | |
| 2014/0008375 A1 | 1/2014 | Zanus | |
| 2014/0054304 A1* | 2/2014 | Hu | A47G 19/2255 |
| | | | 220/630 |

\* cited by examiner

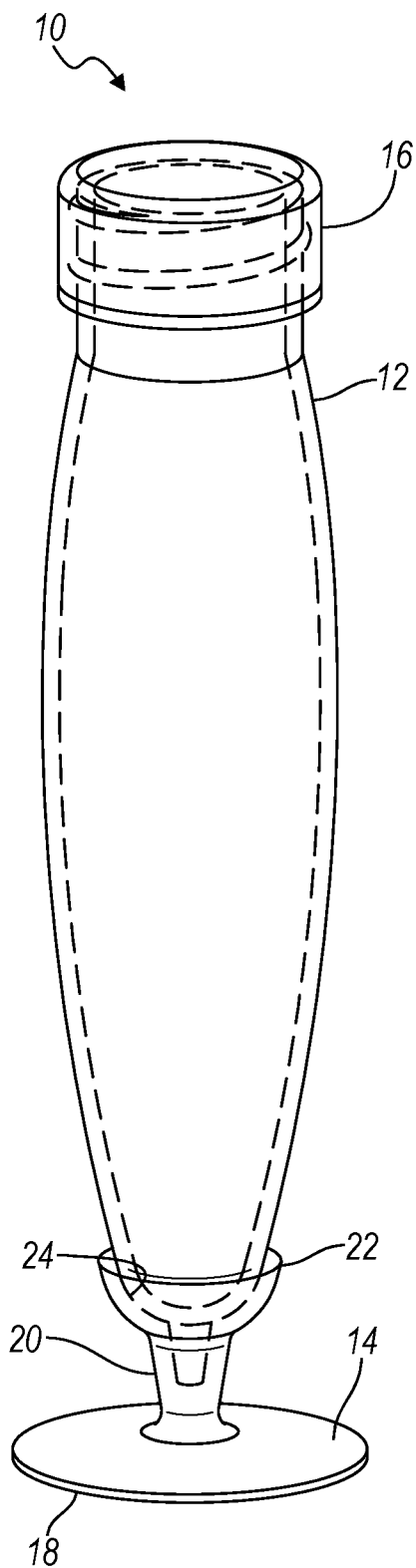
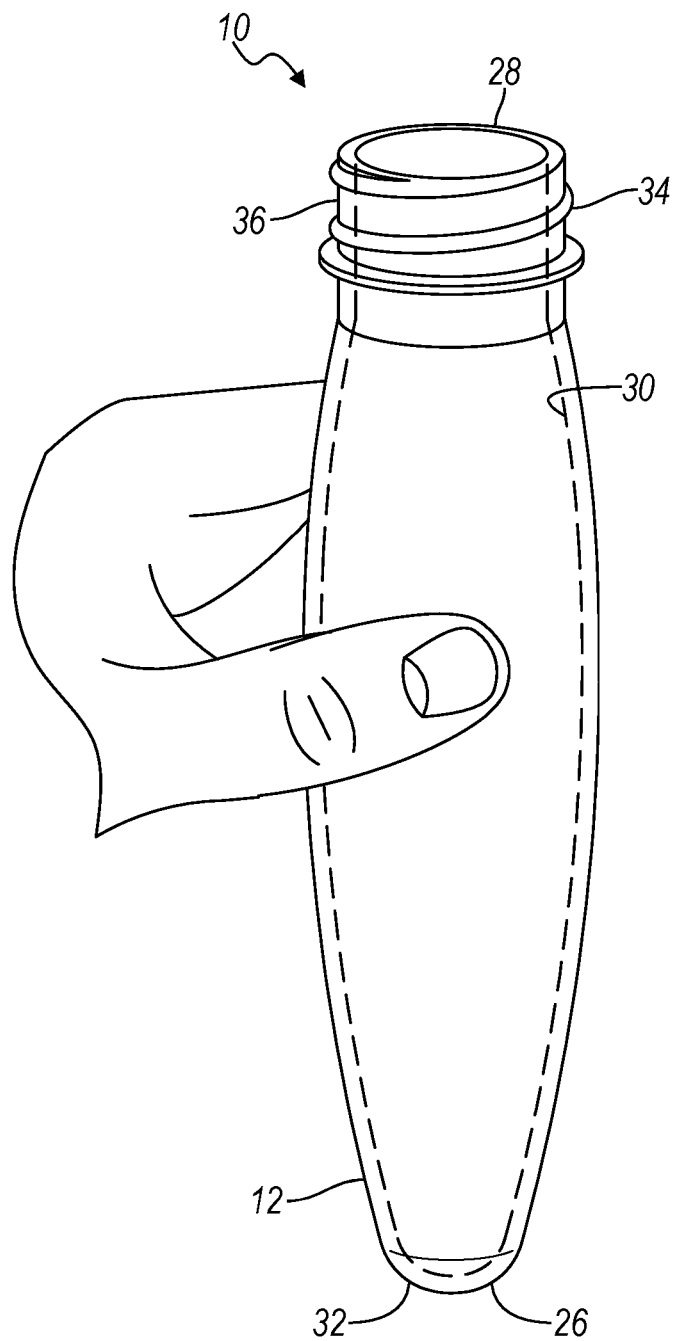
FIG. 1
FIG. 2

BEVERAGE CONTAINER

CROSS REFERENCE TO RELATED APPLICATIONS

This application claims benefit of U.S. Provisional Application No. 62/264,646 filed Dec. 8, 2015. The disclosure of the above application is incorporated herein by reference.

FIELD

The present disclosure relates to blown plastic containers, and more specifically to plastic containers for packaging beverages.

BACKGROUND

The statements in this section merely provide background information related to the present disclosure and may or may not constitute prior art.

Plastic containers have been used to package liquids intended for various purposes including, for example, consumable beverages and cleaning detergents among other common applications. Beverage containers are used to store carbonated and non-carbonated consumable beverages in a variety of volume sizes and functional shapes.

While current plastic beverage containers are useful for their intended purpose, there is room in the art for an improved plastic beverage container that provides a consumer with an improved experience, allows for improved efficiency in manufacturing and transport, and enhances environmental stewardship.

SUMMARY

A beverage container assembly is provided, the beverage container assembly comprising a base, a beverage container, and a sealable cap. The beverage container includes an open end and a closed end opposite the open end. The open end of the beverage container includes an external thread. The sealable cap includes an internal thread. The sealable cap is disposed on the open end of the beverage container creating a sealed opening. The base is disposed on the closed end of the beverage container. The base is detachable from the beverage container. The cap seals the open end of the beverage container.

In another example of the present invention, the beverage container is manufactured of polyethylene terephthalate (PET).

In yet another example of the present invention, the beverage container includes an oxygen $O_2$ ingress barrier and a carbon dioxide $CO_2$ retention barrier.

In yet another example of the present invention, the beverage container comprises a volume from about 165 ml to about 220 ml.

In yet another example of the present invention, the base includes a base portion, a stem, and a cup portion. The stem is disposed between the base portion and the cup portion. The closed end of the beverage container is disposed in the cup portion of the base.

In yet another example of the present invention, the beverage container further includes a pin extending from the closed end. The base includes a bore extending from the cup portion of the base into the stem. The pin of the beverage container is disposed in the bore of the cup portion of the base.

In yet another example of the present invention, the beverage container further includes a bottom diameter, a middle diameter, and a top diameter. The bottom diameter is the less than the middle diameter and the top diameter. The middle diameter is larger than the top diameter.

In yet another example of the present invention, the middle diameter and top diameter of the beverage container range from 32.00 mm to about 50.00 mm.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a perspective view of an exemplary plastic beverage container according to the principles of the present disclosure;

FIG. 2 is a perspective view of an exemplary plastic beverage container according to the principles of the present disclosure;

DETAILED DESCRIPTION

Figure 3:
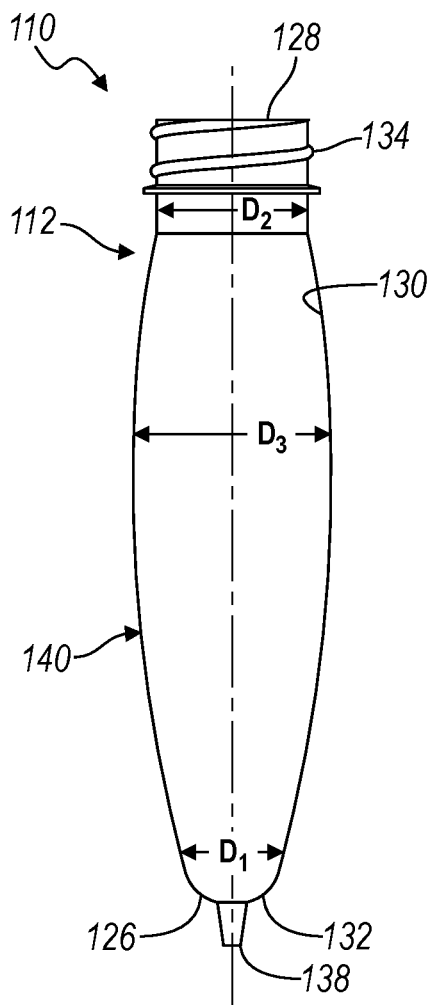
FIG. 3 is a side view of a portion of an exemplary plastic beverage container according to the principles of the present disclosure.

The following description is merely exemplary in nature and is not intended to limit the present disclosure, application, or uses.

With reference to FIGS. 1 and 2, a plastic beverage container assembly 10 is illustrated and will now be described. The plastic beverage container assembly 10 includes a beverage container portion 12, a base 14, and a cap 16. More specifically, the base 14 includes a circular base portion 18, a stem 20 and a saddle or cup portion 22. The stem 20 has a smaller cross sectional diameter than the base and cup portions 18, 22, is disposed between the base portion 18 and the cup portion 22, and thus conjoins the base portion 18 and the cup portion 22. The cup portion 22, disposed atop the stem 20, provides a shallow radius bore 24 for receiving the beverage container portion 12.

The beverage container portion 12 includes a first end 26, a second end 28, and a hollow interior 30. The first end 26 of the beverage container portion 12 is closed and has an outer radius 32 that mimics the radius bore 24 of the base 18. The beverage container portion 12 and the base portion 18 are capable of being detached and reassembled from each other without damage to either the beverage container portion 12 or the base portion 18. The second end 28 of the beverage container portion 12 is open to allow communication between the hollow interior 30 and the exterior of the beverage container portion 12. Furthermore, the second end 28 includes a threaded fastening feature 34 on the exterior surface 36 of the beverage portion 12. The cap 16 has a complementing threaded interior surface 38 that secures and seals the cap 16 to the second end 28 of the beverage portion 12.

Turning now to FIG. 3, an example of the beverage container portion 112 of a plastic beverage container 110 is illustrated and will now be described. The beverage container portion 112 includes a first end 126, a second end 128 and a hollow interior 130. The first end 126 is closed and has an outer radius 132 terminating to a frusto conical location pin 138. The second end 128 is open to allow communication between the hollow interior 130 and the exterior of the beverage container portion 112. Furthermore, the second end 128 includes a threaded fastening feature 134 on the exterior 136 of the beverage container portion 112. The beverage container portion 112 also includes a profile 140 having at least a first, second, and third cross-sectional diameter $D_1$, $D_2$, $D_3$. The first cross-sectional diameter $D_1$ is the smallest of the three diameters and is disposed proximate the first end 126 of the beverage container portion 112. The second cross-sectional diameter $D_2$ is the next largest of the cross-sectional diameters $D_1$, $D_2$, $D_3$ and disposed proximate the second end 128 of the beverage container portion 112. The third cross-sectional diameter $D_3$ is the largest of the cross-sectional diameters $D_1$, $D_2$, $D_3$ and disposed between the first and second cross-sectional diameters $D_1$, $D_2$. In some embodiments, the second cross-sectional diameter $D_2$ ranges from about 32.00 mm to about 38.00 mm, the third cross-sectional diameter $D_3$ ranges from about 40.00 mm to about 50.00 mm, and the volume of the beverage container portion 112 is approximately 165 ml to about 220 ml. Additionally, the beverage container portion 112 of the beverage container assembly 110 may be made from polyethylene terephthalate (PET). PET provides the beverage container portion 112 with an $O_2$ ingress barrier and a $CO_2$ retention barrier. However, other materials may be used to form the beverage container portion 112 without departing from the scope of the present invention.

Figure 4:
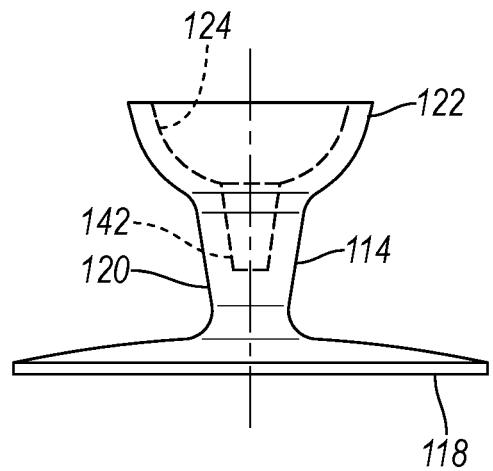
FIG. 4 is a side view of a portion of an exemplary plastic beverage container according to the principles of the present disclosure.
Figure 5:
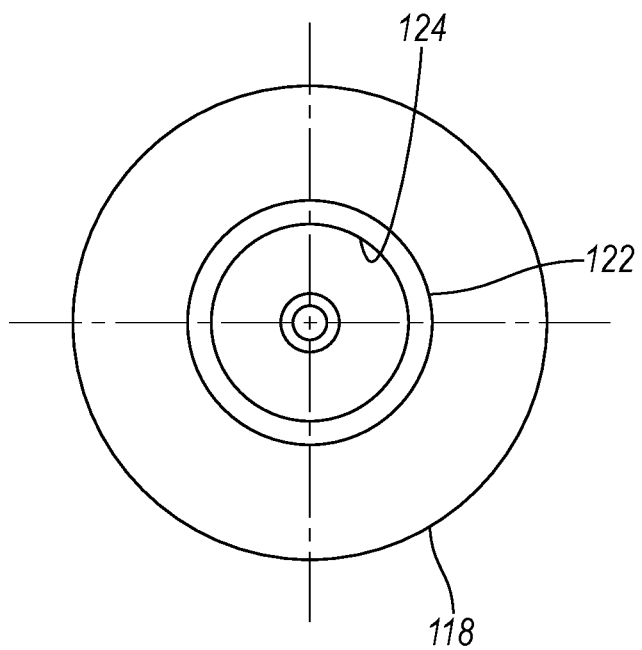
FIG. 5 is a plan view of a portion of an exemplary plastic beverage container according to the principles of the present disclosure.

Referring now to FIGS. 4 and 5, an example of a base 114 of a beverage container assembly 110 is illustrated and will now be described. The base 114 includes a circular base portion 118, a stem 120 and a saddle or cup portion 122. The stem 120 has a smaller diameter than the base and cup portions 118, 122, is disposed between the base portion 118 and the cup portion 122, and thus joins the base portion 118 and the cup portion 122. The cup portion 122, disposed atop the stem 120, provides a shallow radius bore 124 for receiving the beverage portion 112 and includes a frusto conical bore 142 extending from the base or bottom of the cup portion 122 into the stem 120. The bore 142 is designed to mirror the shape of the frusto conical location pin 138 of the first end 126 or base of the beverage portion 112. The insertion of the frusto conical location pin 138 of the beverage container 112 into the frusto conical bore 142 of the base 114 prevents the beverage container 112 from rotating out of the base 114.

Figure 6:
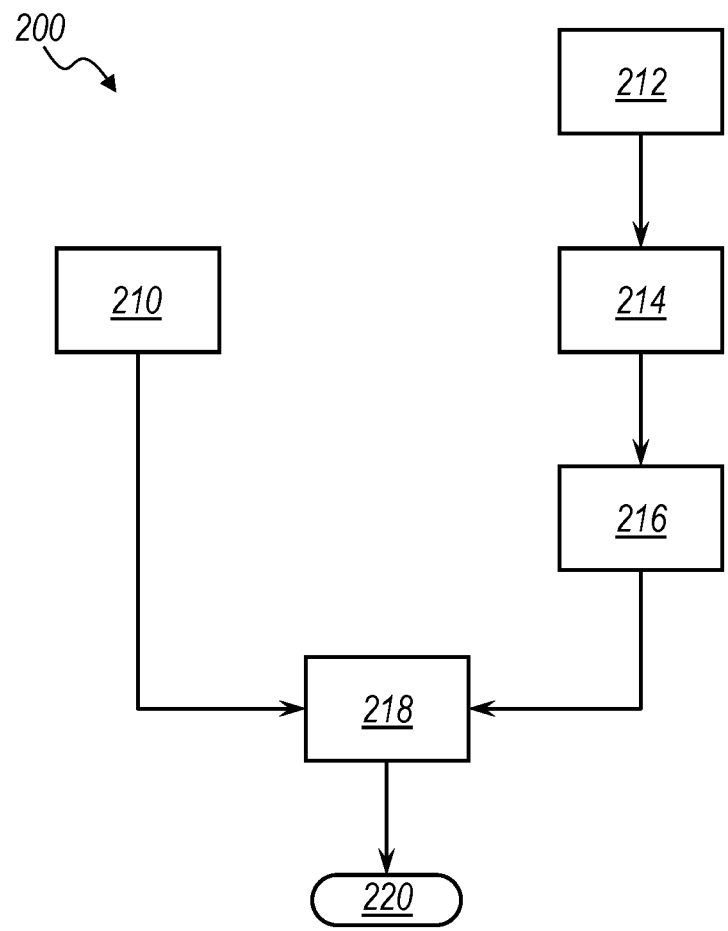
FIG. 6 is a flowchart of a method of manufacturing a plastic beverage container according to the principles of the present disclosure.

Turning now to FIG. 6, a flowchart depicting a method of manufacturing 200 a beverage container assembly 10 is illustrated and will now be described. For example, a first step 210 of manufacturing the beverage container assembly 10 includes one of injection molding and compression molding a base 14 of the beverage container 10. A second step 212 includes stretch blow molding a beverage container portion 12 of the beverage container assembly 10. A third step 214 includes filling the beverage container portion 12 with a beverage. A fourth step 216 includes sealing the beverage container portion 12 with a cap 16. A fifth step includes assembling the beverage container portion 12 with the base 14.

The description of the invention is merely exemplary in nature and variations that do not depart from the gist of the invention are intended to be within the scope of the invention. Such variations are not to be regarded as a departure from the spirit and scope of the invention.

I claim:

1. A beverage container assembly, the beverage container assembly comprising:
   a base;
   a beverage container having an open end and a closed end opposite the open end, and wherein the open end of the beverage container includes an external thread, the base is disposed on the closed end of the beverage container, and the base is detachable from the beverage container; and
   a sealable cap having an internal thread, and wherein the sealable cap is disposed on the open end of the beverage container creating a sealed opening,
   wherein the base comprises a base portion, a stem, and a cup portion, and wherein the stem is disposed between the base portion and the cup portion and the closed end of the beverage container is disposed in the cup portion of the base,
   wherein the beverage container further includes a location pin extending from the closed end, the base includes a location bore extending from the cup portion of the base into the stem, and the location pin of the beverage container is disposed in the location bore of the cup portion of the base.

2. The beverage container assembly of claim 1, wherein the beverage container is manufactured of polyethylene terephthalate (PET).

3. The beverage container assembly of claim 1 wherein the beverage container is an oxygen $O_2$ ingress barrier and a carbon dioxide $CO_2$ retention barrier.

4. The beverage container assembly of claim 1 wherein the beverage container comprises a volume from about 165 ml to about 220 ml.

5. The beverage container assembly of claim 1 wherein the beverage container further includes a bottom diameter, a middle diameter, and a top diameter, the bottom diameter is the less than the middle diameter and the top diameter, and the middle diameter is larger than the top diameter.

6. The beverage container assembly of claim 1 wherein a dimension of the middle diameter and of the top diameter of the beverage container range from 32.00 mm to about 50.00 mm.

* * * * *